(12) United States Patent
Mitchell et al.

(10) Patent No.: US 9,470,132 B2
(45) Date of Patent: Oct. 18, 2016

(54) COMPACT RADIAL EXTERIOR EXHAUST ASSISTED DECOMPOSITION REACTOR PIPE

(71) Applicant: Cummins Emission Solutions, Inc., Columbus, IN (US)

(72) Inventors: Douglas A. Mitchell, Indianapolis, IN (US); Ryan M. Johnson, Cottage Grove, WI (US); Kartiki Jagtap, Phaltan (IN); Mahendra Mittapalli, Mancherial (IN); Mihai Chiruta, Madision, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 13 days.

(21) Appl. No.: 14/561,646

(22) Filed: Dec. 5, 2014

(65) Prior Publication Data

US 2016/0160728 A1   Jun. 9, 2016

(51) Int. Cl.
| | |
|---|---|
| *F01N 3/00* | (2006.01) |
| *F01N 3/28* | (2006.01) |
| *F01N 3/021* | (2006.01) |
| *F01N 3/20* | (2006.01) |

(52) U.S. Cl.
CPC ............. *F01N 3/2896* (2013.01); *F01N 3/021* (2013.01); *F01N 3/2066* (2013.01)

(58) Field of Classification Search
USPC .......... 60/286, 295, 297, 301, 303, 317, 324
See application file for complete search history.

(56) References Cited

U.S. PATENT DOCUMENTS

| | | | |
|---|---|---|---|
| 7,497,077 B2 | 3/2009 | Dodge et al. | |
| 7,682,586 B2 | 3/2010 | Harold et al. | |
| 7,712,305 B2 * | 5/2010 | Kapsos | B01F 3/04049 60/282 |
| 7,784,273 B2 * | 8/2010 | Kanaya | B01D 53/9431 60/286 |
| 7,877,983 B2 * | 2/2011 | Kunkel | B01F 3/04049 239/418 |
| 8,240,137 B2 | 8/2012 | Liu et al. | |
| 8,539,761 B2 | 9/2013 | Lebas et al. | |
| 8,549,842 B2 | 10/2013 | Park | |

(Continued)

FOREIGN PATENT DOCUMENTS

| | | |
|---|---|---|
| CN | 102840014 | 12/2012 |
| DE | 10 2010 045 7 | 3/2012 |

(Continued)

OTHER PUBLICATIONS

Search Report for United Kingdom Patent Application No. GB1520906.7, issued Jun. 1, 2016, 3 pages.

*Primary Examiner* — Binh Q Tran
(74) *Attorney, Agent, or Firm* — Foley & Lardner LLP (57) ABSTRACT

Various embodiments provide for apparatuses and systems involving a reactor pipe configured to receive reductant from an injector into a flow of exhaust exiting an engine. The reactor pipe comprises an inlet portion, a plurality of louvers, an outlet portion, and a radial loop. The inlet portion is structured to receive the flow exiting the engine into the reactor pipe. The louvers are structured to alter a direction of the flow. Further, the radial loop is configured to extend between the inlet portion and the outlet portion and receives the flow of exhaust through the inlet portion. The radial loop also directs the flow of the exhaust toward the outlet portion and reduces the velocity of the flow of the exhaust such that the reductant has an increased amount of time to react with the exhaust.

30 Claims, 9 Drawing Sheets

(56) References Cited

U.S. PATENT DOCUMENTS

| | | | |
|---|---|---|---|
| 8,661,792 B2* | 3/2014 | Greber | F01N 3/2066 60/286 |
| 8,696,193 B2 | 4/2014 | Herbstritt | |
| 9,157,358 B2* | 10/2015 | Beckmann | F01N 3/2066 |
| 9,217,348 B2* | 12/2015 | Kimura | F01N 3/2066 |
| 9,248,404 B2* | 2/2016 | Brunel | B01F 3/04049 |
| 2010/0263359 A1 | 10/2010 | Haverkamp et al. | |
| 2011/0094206 A1 | 4/2011 | Liu et al. | |
| 2011/0271662 A1 | 11/2011 | Winsor | |
| 2011/0308234 A1 | 12/2011 | De Rudder et al. | |
| 2013/0152558 A1 | 6/2013 | Loman | |
| 2013/0174537 A1 | 7/2013 | Loman et al. | |
| 2013/0180898 A1 | 7/2013 | Chajec et al. | |
| 2013/0216442 A1 | 8/2013 | Brunel et al. | |
| 2013/0340417 A1 | 12/2013 | Morey et al. | |
| 2015/0308316 A1 | 10/2015 | Li et al. | |

FOREIGN PATENT DOCUMENTS

| | | |
|---|---|---|
| EP | 1 339 479 | 9/2003 |
| EP | 1 741 887 | 1/2007 |
| EP | 2 014 883 | 1/2009 |
| EP | 2 339 137 | 6/2011 |
| EP | 2 339 139 | 6/2011 |
| EP | 2 465 602 | 6/2012 |
| FR | 2966513 | 5/2013 |
| WO | WO-2013/112146 | 8/2013 |
| WO | WO-2013/178321 | 12/2013 |

* cited by examiner

COMPACT RADIAL EXTERIOR EXHAUST ASSISTED DECOMPOSITION REACTOR PIPE

TECHNICAL FIELD

The present disclosure relates generally to aftertreatment systems for treating exhaust from internal combustion engines.

BACKGROUND

Selective catalytic reduction exhaust aftertreatment systems are an important technology for reducing harmful emissions from internal combustion engines. Selective catalytic reduction catalyst aftertreatment systems generally include a source of storage for reductant (particularly diesel exhaust fluid) and a dosing unit that includes at least one of a pump unit for pressurizing the reductant. The selective catalytic reduction catalyst aftertreatment systems may also include a metering unit for providing a controlled amount or rate of reductant and an injector, which provides a reductant solution to a decomposition region of an exhaust flow path located upstream of a selective catalytic reduction catalyst. Some selective catalytic reduction catalyst aftertreatment systems also utilize pressurized gas to assist the flow of reductant to the injector.

While being useful in reducing nitrogen oxide emissions, selective catalytic reduction catalyst systems may suffer from a number of shortcomings. For example, the reductant injected into the exhaust flow may not properly mix with the exhaust flow exiting an engine. In some instances, the reductant can puddle along an inner wall of the exhaust system, forming a deposit over time.

SUMMARY

Various embodiments provide for a reactor pipe configured to receive an injection of reductant from an injector into exhaust exiting an engine. The reactor pipe comprises an inlet portion, a plurality of louvers, an outlet portion, and a radial loop. The inlet portion is structured to receive the flow of exhaust exiting the engine into the reactor pipe. The louvers are positioned proximate the inlet portion and structured to alter a direction of the flow of exhaust. The outlet portion is in fluid communication with a selective catalytic reduction catalyst and structured to allow the exhaust to exit the reactor pipe and enter the selective catalytic reduction catalyst. Further, the radial loop is configured to extend between the inlet portion and the outlet portion and receives the exhaust through the inlet portion. The radial loop also directs the exhaust toward the outlet portion. The radial loop is configured to reduce the velocity of the exhaust such that the reductant has increased time to react with the exhaust.

Further embodiments provide for an aftertreatment system comprising an injector, a catalyst, and a reactor pipe. The injector is structured to inject a reductant into the exhaust flow received from an engine. The catalyst is positioned downstream of the injector and structured to treat the exhaust. The reactor pipe, positioned upstream of the catalyst, is structured to receive the reductant from the injector. The reactor pipe comprises an inlet portion, a plurality of louvers, an outlet portion, and a radial loop. The inlet portion is structured to receive the exhaust. The louvers are positioned proximate the inlet portion and structured to redirect the flow of the exhaust. The outlet portion is structured to allow the exhaust to exit the reactor pipe. The radial loop extends between the inlet portion and the outlet portion and receives the exhaust flow into the inlet portion. Further, the radial loop directs the exhaust flow toward the outlet portion and is configured to reduce the velocity of the exhaust such that the reductant has increased time to react with the exhaust.

Still further embodiments provide for an engine system that is configured to release exhaust with fewer harmful substances into an engine system, comprising an engine and an aftertreatment system. The aftertreatment system is in fluid communication with the engine and structured to treat exhaust exiting the engine. The aftertreatment system includes a selective catalytic reduction catalyst positioned downstream of the engine and structured to receive the exhaust flow from the engine. The aftertreatment system also includes a reactor pipe in fluid communication with the engine and the selective catalytic reduction catalyst. The reactor pipe, positioned upstream of the selective catalytic reduction catalyst, comprises an inlet portion, a plurality of louvers, an outlet portion, one or more perforated plates, and a radial loop. The inlet portion is structured to receive the exhaust. The louvers are positioned proximate the inlet portion and structured to adjust the direction of the exhaust flow. The outlet portion is structured to allow the exhaust to exit the reactor pipe. The one or more perforated plates, positioned proximate the outlet portion, are configured to open incrementally to different positions. Also, the radial loop extends between the inlet portion and the outlet portion. The radial loop receives the exhaust flow from the inlet portion and directs the exhaust flow toward the outlet portion. Further, the radial loop is configured to reduce the velocity of the exhaust such that inserted reductant has increased time to react with the exhaust.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

The apparatus and systems described herein relates to a decomposition reactor pipe (also referred to as "reactor pipe") that is configured to be used in an aftertreatment system. The reactor pipe can be used with an aftertreatment component, such as a selective catalytic reduction catalyst. According to one embodiment, the reactor pipe serves as a decomposition chamber in which exhaust from an engine interacts with a reductant (e.g., diesel exhaust fluid). The reactor pipe is configured to receive a flow of exhaust exiting an engine. The reactor pipe can be configured to receive an injection of reductant from an injector or dosing unit. The reactor pipe described herein enables the effective delivery of reductant to an aftertreatment component (e.g., selective catalytic reduction catalyst) for the reduction of nitrogen oxides, for example.

Several benefits may be realized by implementing features of the reactor pipe discussed herein. The uniformity index (e.g., the spread of the reductant at the face of a catalyst) and reductant evaporation may be maximized by the features of the reactor pipe described. Also, the reactor pipe may minimize reductant deposits along the reactor pipe's interior surface, ambient effects, and pressure restrictions. Due to the radial feature of the reactor pipe, the pipe itself may be constructed in a smaller axial size to reduce and minimize space claimed as well as the cost of material. Additionally, the use of the reduced-size reactor pipe maintains the ability to withstand dosing at high diesel exhaust fluid injection rates. In one example, embodiments of a reactor pipe described throughout may implement features disclosed in U.S. Provisional Patent Application No. 61/890,764 titled "Diesel Exhaust Fluid Deposit Mitigation", which is hereby incorporated by reference in its entirety.

Figure 1:
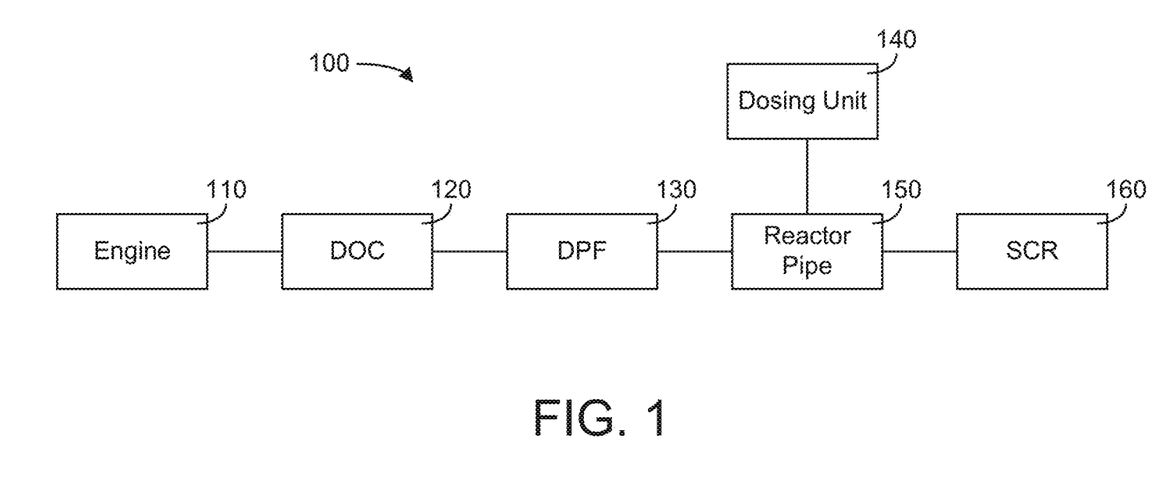
FIG. 1 is a schematic view of a system including a reactor pipe, according to an example embodiment.

Referring to FIG. 1, a schematic view of a system 100 including a reactor pipe 150 according to an example embodiment is shown. The system 100 comprises an engine 110, an oxidation catalyst 120, a diesel particulate filter 130, a dosing unit 140, a reactor pipe 150, and a selective catalytic reduction catalyst 160. The system 100 may also include a delivery mechanism for delivering reductant (e.g., diesel exhaust fluid) from a storage tank to an exhaust system connected to an engine 110. In one embodiment, the system 100 is provided on a vehicle powered by the engine 110. In other embodiments, the system 100 may be provided on an engine 110 utilized in other applications such power generation, pumping systems, or any other application which receives or uses power from the engine 110.

The engine 110 can be a diesel engine or any suitable internal combustion engine for which exhaust treatment with a reductant is provided. The engine 110 creates exhaust from combustions occurring within the engine cylinders when the engine 110 is operating. The engine 110 can include one or more engine cylinders that receive fuel and air through an intake system (not shown) to create a combustion. In some embodiments, an intake system may include a turbocharger that receives pressured air from the atmosphere and transfers the air to an intake manifold connected to the engine cylinders. The energy released by combustion within the engine cylinders is used to propel, for example, a vehicle hosting the engine 110. The exhaust resulting from the combustion may exit the engine through an exhaust manifold (not shown).

The exhaust may pass through several components before entering the atmosphere. Still referring to FIG. 1, the exhaust may exit the engine 110 and flow into the diesel oxidation catalyst 120. The diesel oxidation catalyst 120 is an aftertreatment for exhaust that oxidizes elements found within the exhaust. For example, the diesel oxidation catalyst 120 may oxidize hydrocarbons and carbon monoxide into carbon dioxide and water. The exhaust may also pass through the diesel particulate filter 130, which filters out particulate matter and soot from the exhaust. Upon exiting the diesel particulate filter 130, the exhaust may flow into a reactor pipe 150. The reactor pipe 150 is configured to receive the exhaust into a conduit thereof, along with a reductant such that the exhaust and the reactant can properly mix and decompose. The reductant, in the form of diesel exhaust fluid may comprise a urea based solution that mixes with the exhaust to chemically decompose into ammonia. One example of diesel exhaust fluid comprises a solution of 32.5% high purity urea and 67.5% deionized water. It shall be appreciated, however, that other diesel exhaust fluid solutions and reductants may also be utilized. As discussed above, the reactor pipe 150 serves as a chamber for diesel exhaust fluid to interact with elements in the exhaust and decompose into ammonia. Further details regarding the reactor pipe 150 are discussed below and shown in remaining figures.

A dosing unit 140 may be connectable to the reactor pipe 150 to transfer diesel exhaust fluid to the reactor pipe 150. The dosing unit 140 may include an injector configured to inject the diesel exhaust fluid into the exhaust flowing through the reactor pipe 150. In some embodiments, the dosing unit 140 can be mounted on a portion of the exhaust system upstream of the selective catalytic reduction catalyst 160. For example, the dosing unit 140 may be mounted such that the injector is configured to inject diesel exhaust fluid near an inlet portion (e.g., an end connected to the diesel particulate filter 130) of the reactor pipe 150. The injector can have an outlet portion (a nozzle in a particular embodiment) arranged to spray or otherwise insert aqueous reductant droplets into the exhaust.

The exhaust flows out of the reactor pipe 150 into the selective catalytic reduction catalyst 160 as shown in FIG. 1. According to one embodiment, the selective catalytic reduction catalyst 160 can be used to convert nitrogen oxides into less harmful substances such as nitrogen and water. To facilitate the conversion, the selective catalytic reduction catalyst 160 may use a reductant such as urea to reduce the nitrogen oxides into diatomic nitrogen and water, for example.

The dosing unit 140 may include various structures to facilitate transfer of the diesel exhaust fluid from the storage tank to the dosing unit 140 and the delivery of the diesel exhaust fluid to parts of an exhaust system (e.g., the reactor pipe 150). For example, the dosing unit 140 can include a pump, a filter screen, and a check valve upstream of the pump to receive diesel exhaust fluid from the storage tank. In one form, the pump is a diaphragm pump, though it shall be appreciated that any other type of pump may be utilized. The pump can output pressurized diesel exhaust fluid at a predetermined pressure, which can flow through a second check valve, a pulsation dampener, and a second filter to provide pressurized reductant to a metering valve. In some embodiments, the dosing unit 140 can further include a bypass line around the pump having a bypass valve operable to open/close and to permit or prevent the flow of diesel exhaust fluid through the bypass line to a location upstream of the first filter screen. In one embodiment, the diesel exhaust fluid may be returned to the storage tank, for example, during a purging operation.

In some embodiments, the dosing unit 140 uses air-assisted technology to inject reductant into the exhaust flow. In other embodiments, the dosing unit 140 can be of an airless configuration, in that the injector can discharge the diesel exhaust fluid without a combined flow of pressurized air. The storage tank can hold a supply of diesel exhaust fluid and can be vented to allow the reductant to be withdrawn at a port in the storage tank. A conduit can extend from the port to the dosing unit 140 to allow the dosing unit 140 to be in fluid communication with the storage tank. The dosing unit 140 may also be in fluid communication with the injector. When the dosing unit 140 operates, it can draw reductant from the storage tank through the conduit, and can pump the reductant to the injector. A backflow conduit (not shown) may be provided to return excess reductant to the storage tank. The dosing unit 140 can be controlled through a controller.

Figure 2:
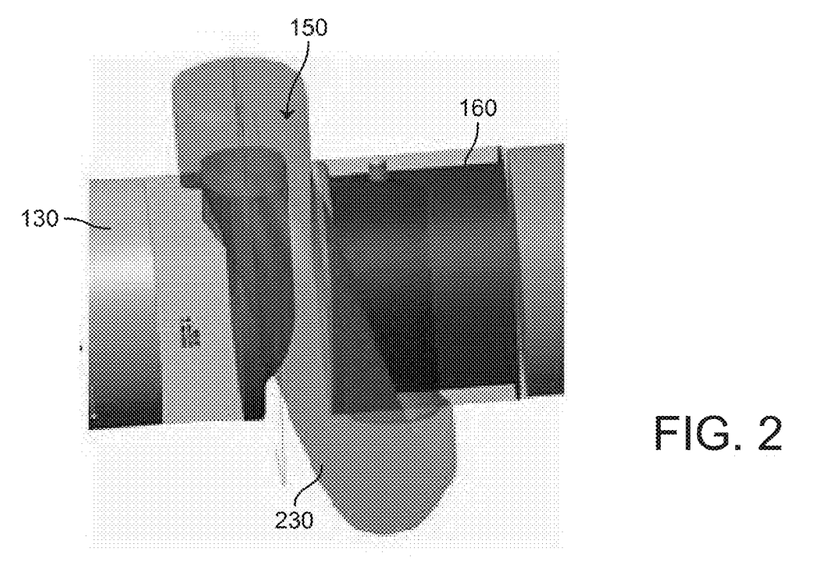
FIG. 2 a front view of one embodiment of a reactor pipe connected to a diesel particulate filter and a selective catalytic reduction catalyst.

FIG. 2 shows a front view of one embodiment of a reactor pipe 150 connected to a diesel particulate filter 130 and a selective catalytic reduction catalyst 160. The diesel particulate filter 130 and the selective catalytic reduction catalyst 160 are shown positioned substantially in-line with each other. Each of the diesel particulate filter 130 and the selective catalytic reduction catalyst 160 have an opening on the end to allow exhaust flow to enter and exit the structures. The exhaust flow may enter the diesel particulate filter 130 and exit through the diesel particulate filter's opening to enter into the reactor pipe 150. The exhaust flow may then travel through the body of the reactor pipe 150 and exit out of the reactor pipe 150. The exhaust flow can then enter into the selective catalytic reduction catalyst 160 to be treated before entering the atmosphere.

The embodiment of the reactor pipe 150 shown in FIG. 2 has two ends (e.g., an inlet portion and an outlet portion) and a body 230 connecting the ends. The reactor pipe 150 has a conduit area inside the body 230 that allows the reactor pipe 150 to serve as a channel to allow the diesel particulate filter 130 to fluidly connect with selective catalytic reduction catalyst 160. The body 230 of the reactor pipe curves around the in-line direction of the diesel particulate filter 130 and the selective catalytic reduction catalyst 160 to create a radial loop. The radial loop is an exterior loop that interrupts the flow of the exhaust flow by directing the exhaust flow radially around an in-line path from the diesel particulate filter 130 to the selective catalytic reduction catalyst 160. The radial loop may have a helical or a non-helical shape. In one embodiment, the radial loop can spiral around the body of an aftertreatment system comprising a diesel particulate filter 130 and/or a diesel oxidation catalyst 120 substantially in-line with a selective catalytic reduction catalyst 160. In other embodiments, the diesel particulate filter 130 and/or diesel oxidation catalyst 120 are not positioned in line with the selective catalytic reduction catalyst 160. The radial loop is configured to reduce the velocity of the flow of the exhaust such that the reductant has increased time to react with the exhaust. In some embodiments, the radial loop reduces the speed of the flow of exhaust through the pipe. The radial loop of the body 230 contributes to make the reactor pipe 150 axially compact, which in turn cuts the cost of material and increases the use of space within the vehicle.

Figure 3:
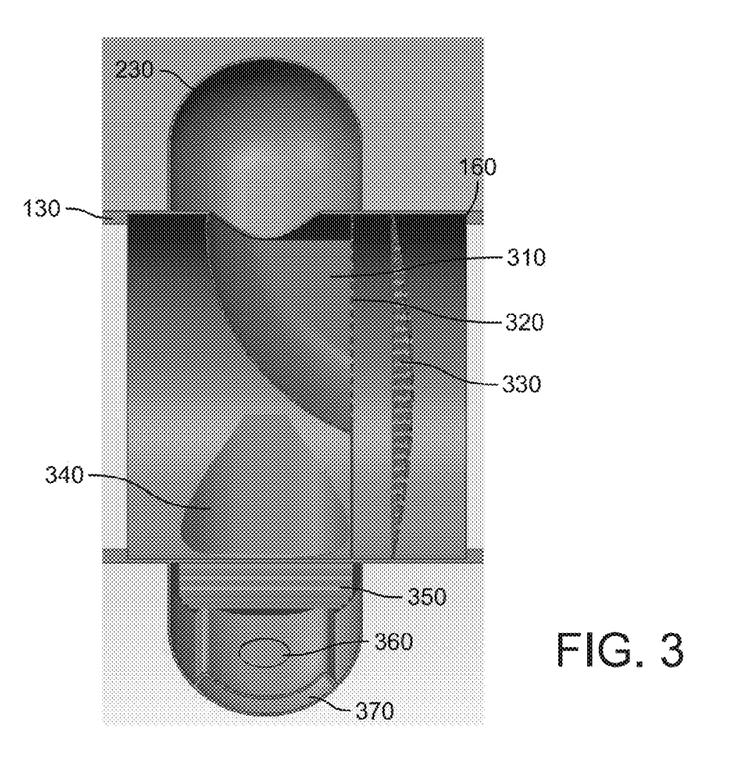
FIG. 3 is a cross-sectional view of another embodiment of a reactor pipe.

FIG. 3 shows a cross-sectional view of another embodiment of a reactor pipe 150. Exhaust flow may enter the reactor pipe 150 through a variety of manners, including a main inlet portion that allows air to enter the conduit inside the reactor pipe 150. In some embodiments, the inlet portion of the reactor pipe 150 is shaped to prevent a stagnation point at the entrance to the reactor pipe 150. The inlet portion may also be shaped to prevent a stagnation point at the wall exiting the diesel oxidation catalyst 120 or the diesel particulate filter 130 fluidly connected to the reactor pipe 150. The reactor pipe 150 can have a port 360 in which an injector may inject diesel exhaust fluid. Portions of the exhaust flow entering the reactor pipe 150 may be directed toward the port 360 to allow better integration of the diesel exhaust fluid into a main stream of exhaust flowing through the reactor pipe 150. In some embodiments, material such as diesel exhaust fluid may puddle against the interior wall of the reactor pipe 150 and may create deposits along the surface. In order to prevent the deposits, bypass air flowing through a canal 370 can increase heat transfer from the exhaust to spaces along the interior wall of the reactor pipe 150. Exhaust may enter into the reactor pipe 150 through the flow passage 360 to combine with the reductant and exhaust mixture. Additionally, the produced flow can assist in directing the mixed flow of exhaust and reductant toward a centerline of the reactor pipe 150 away from the interior walls. In some embodiments, portions of the reactor pipe 150 (e.g., the canal 370) can further release exhaust unmixed with diesel exhaust fluid downstream of the reactor pipe 150 to further aid in preventing the impingement of the diesel exhaust fluid upon the interior walls of the reactor pipe 150.

The reactant pipe 150 can have a variety of structures to further mix the flow. According to some embodiments, the inlet portion is shaped with the addition of a plurality of louvers 350, which alter the direction of the flow to allow for a smooth transition from a catalyst diameter (e.g., the diameter of a diesel oxidation catalyst 120) into the reactor pipe 150. For example, the louvers 350 can provide angled surfaces that protrude in front of the flow to guide the flow by controlling the velocity vectors. In some embodiments, the louvers 350 condition the flow to direct a portion of the exhaust flow entering the reactor pipe 150 into exhaust assisted ports (e.g., port 360) to assist with mixing the reductant with the exhaust flow. For example, in one particular implementation, the design may direct approximately 15% into exhaust assisted ports to assist with entraining the droplets into the flow and preventing deposits (especially at the injector tip). The flow conditioning also directs the flow so that it does not create a stagnation and impingement zone inside the radial pipe. The louvers 350 help to prevent the tangential momentum of the flow from directing all of the reductant droplets into the inside wall surface of the reactor pipe 150. Additionally, by actively directing the flow and preventing stagnation, the overall pressure restriction of the reactor pipe 150 can be reduced.

Figure 4:
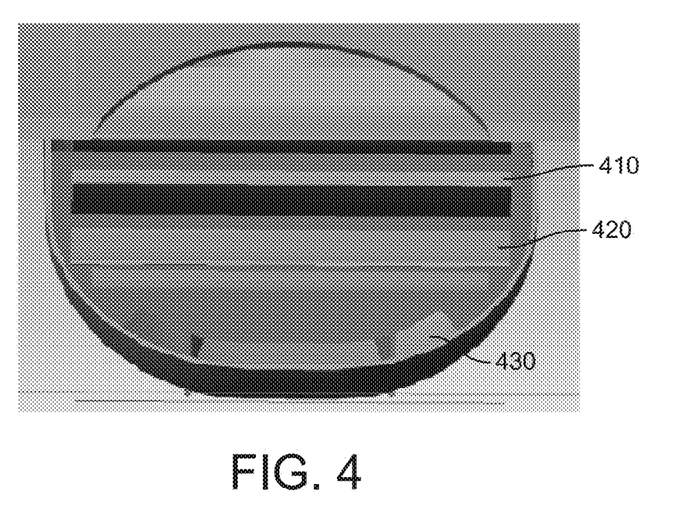
FIG. 4 is a cross-sectional view of a portion of a reactor pipe.

Referring further to FIG. 3, the exhaust flow can travel through the conduit 340 of the reactor pipe 150 toward an outlet portion 310. The exhaust may further travel through a number of perforated plates 320. The perforated plates 320 may vary in number, perforations, openings, textures, shapes, etc., to direct the flow of the exhaust flow. In some embodiments, the perforated plates 320 are structured to uniformly distribute the reductant over a face 330 of the selective catalytic reduction catalyst 160 such that the face 330 of the selective catalytic reduction catalyst 160 may receive the reductant with increased uniformity. In one embodiment, the reactor pipe 150 may have two stages of perforated plates, the perforated plates opening by different amounts. In one embodiment, the plurality of perforated plates are structured to open incrementally to different positions. For example, as shown in FIG. 4, a first louver 410 is opened at one position, while a second louver 420 is incrementally opened at a position different from the first louver 410. The degree at which the second louver 420 is opened may be more or less than the degree at which the first louver 410 is opened. FIG. 4 also shows the added exhaust assisted section 430 within the reactor pipe 150. The perforated plates 320 can help maximize the flow distribution index and uniformity index simultaneously.

Figure 5:
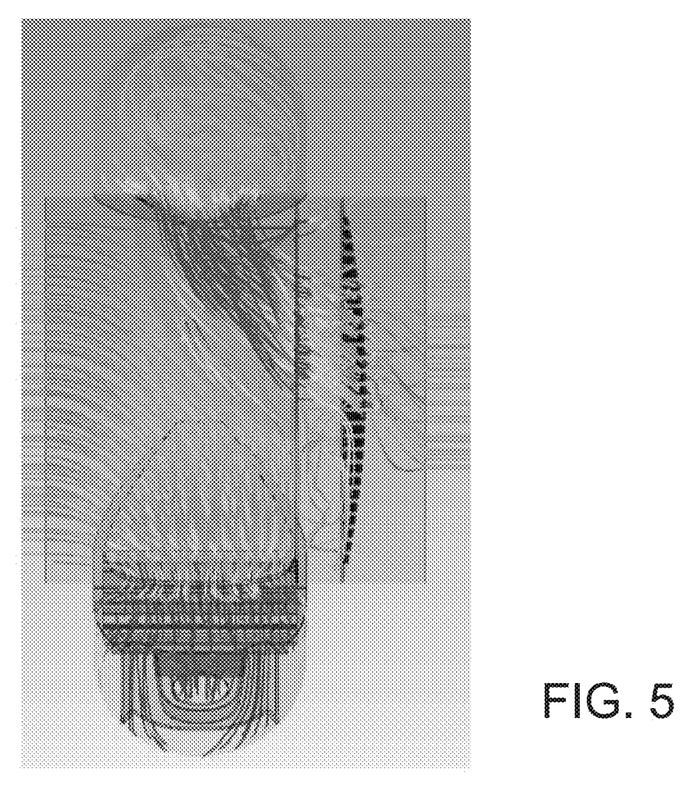
FIG. 5 is a cross-sectional view of the reactor pipe of FIG. 3 showing a flow of exhaust, according to one embodiment.
Figure 6:
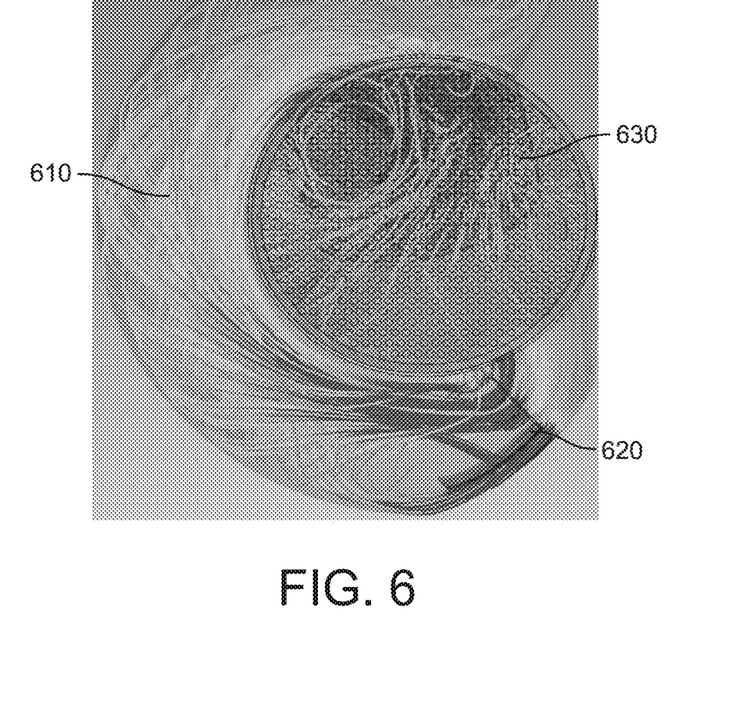
FIG. 6 is a side view of the reactor pipe of FIG. 3 showing a flow of exhaust.

FIGS. 5 and 6 show the velocity of the exhaust flow and/or exhaust and reductant mixture traveling through the reactor pipe 150. FIG. 5 displays a cross-sectional view of the exhaust flow through the reactor pipe of FIG. 3, and FIG. 6 is a side view of the exhaust flow in the reactor pipe of FIG. 3. The velocity and speed of the exhaust flow varies at different locations along the flow path of the reactor pipe 150, from the inlet portion to the outlet portion. In one embodiment, the velocity of the exhaust flow in the radial loop downstream of the inlet portion of the reactor pipe 150 is lower than the velocity of the exhaust flow at the entrance into the inlet portion of the reactor pipe 150. In some embodiments, the velocity of the exhaust flow proximate the middle arc 610 of the radial loop is lower than the velocity of the exhaust flow proximate the inlet portion and/or the outlet portion of the reactor pipe 150.

As discussed above, the radial exterior nature of the embodiments described throughout allows for a long residence time of the droplet before it is introduced and distributed to the face of a catalyst. Due to the slowed velocity, for example, the diesel exhaust fluid has time to fully evaporate and complete a significant part of thermolysis. This has the advantage of reducing wall film on the perforated plates or other flow features that are needed to distribute the reductant across the catalyst face. This guards against the reductant containing liquid water or having not started thermolysis, which can result in large deposits (e.g., consisting of urea, biuret, and triuret) forming on the surfaces of the reactor pipe 150, changes in the flow distribution index, and drastically lower the overall uniformity. The radial nature also reduces the axial length of the decomposition chamber by using the existing space reserved for the catalysts. In some examples, the reactor pipe 150 can have a 5" cross-sectional area, although other areas may also be used in other implementations. The addition of louvers and other flow mixers can increase the margin in pressure requirements, which can be used to compress the pipe into a smaller area.

Figure 7:
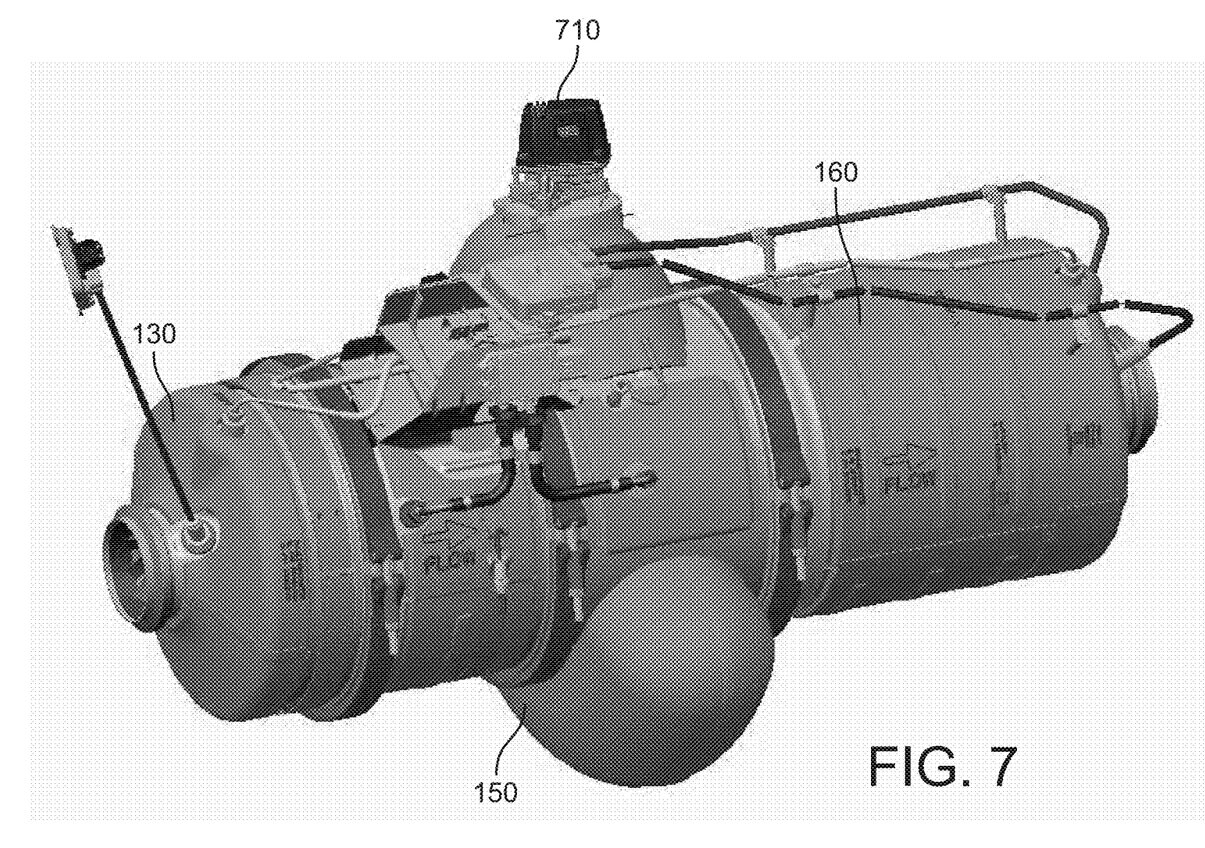
FIG. 7 is perspective view of an aftertreatment system including the reactor pipe of FIG. 3.
Figure 8:
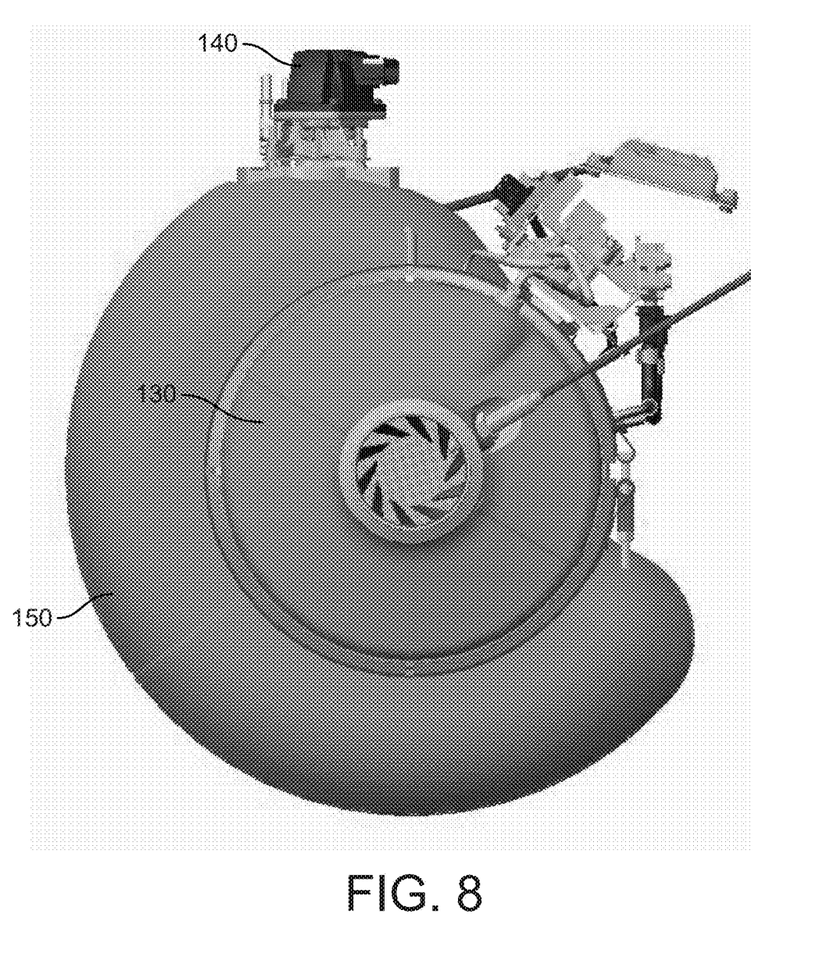
FIG. 8 is a side view of the reactor pipe of FIG. 7.
Figure 9:
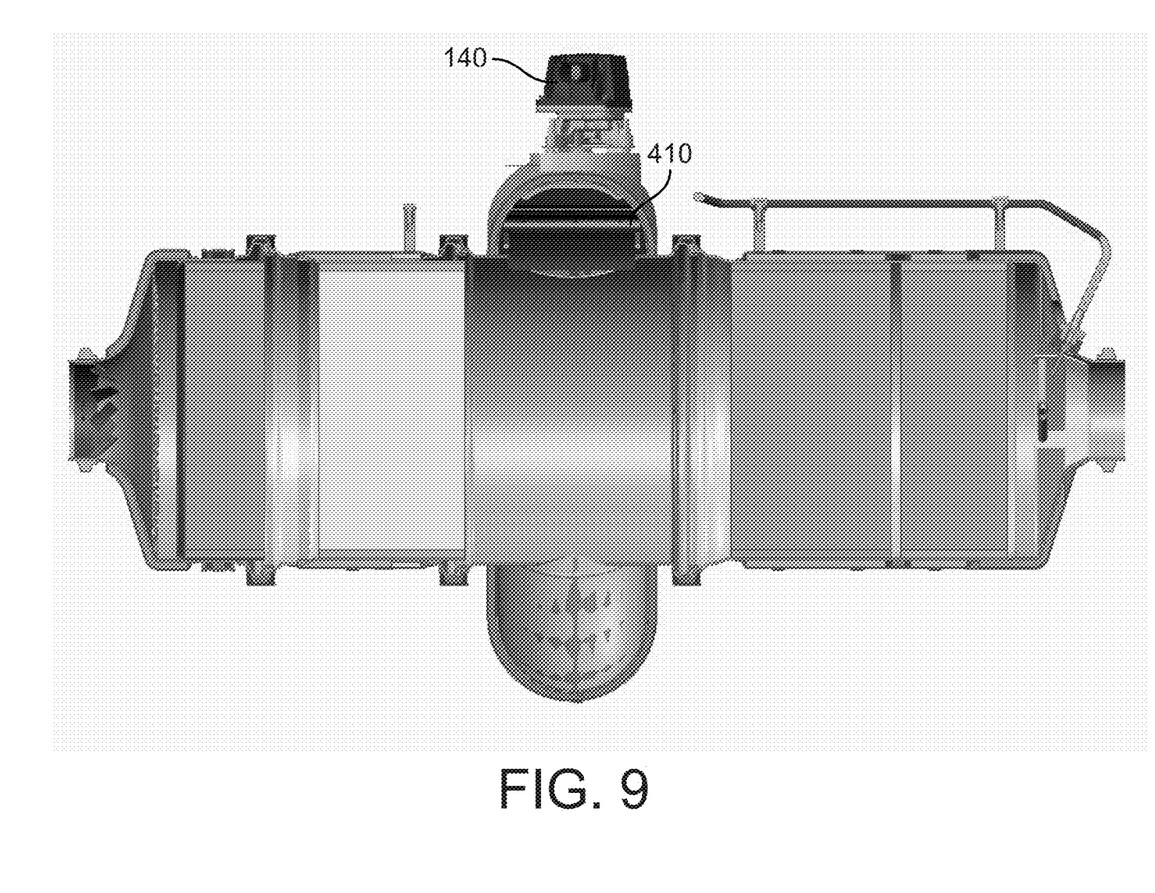
FIG. 9 is a cross-sectional view of the reactor pipe of FIG. 7.

FIGS. 7, 8, and 9 show various system-level views including the reactor pipe 150. FIG. 7 shows a perspective view of the reactor pipe 150, FIG. 8 shows a side view of the reactor pipe 150, and FIG. 9 shows a cross-sectional view of the reactor pipe 150 in the aftertreatment system. The reactor pipe 150 is connected to the aftertreatment system, which has a diesel particulate filter 130 and a selective catalytic reduction catalyst 160. The dosing unit 140 is shown mounted on the radial loop of the reactor pipe 150. In one embodiment, the radial loop may curve around the exterior of the diesel particulate filter 130 and the selective catalytic reduction catalyst 160 greater than 180 degrees. As discussed above with respect to various embodiments of the reactor pipe 150, the reactor pipe 150 of FIGS. 7, 8, and 9 can have similar components described throughout such as an inlet portion, an outlet portion, a plurality of louvers, and a radial loop, for example. The inlet portion can be specifically shaped to start redirecting the flow around the exterior radial loop. Louvers can direct the flow through the exhaust assisted sections near the diesel exhaust fluid injection location while simultaneously conditioning the flow as it moves through the radial loop without pushing all of the droplets into the wall. The radial loop allows for the diesel exhaust fluid to be evaporated and sufficient time for thermolysis to be initiated before the reductant needs to be distributed. The outlet portion begins the process of uniformly distributing the reductant across the catalyst face while a series of perforated plates maximize the uniformity and flow distribution. Also, the exterior and radial nature of the reactor pipe allows for maximum decomposition and reductant distribution in an extremely small axial length without increasing backpressure or space claim.

Figure 10:
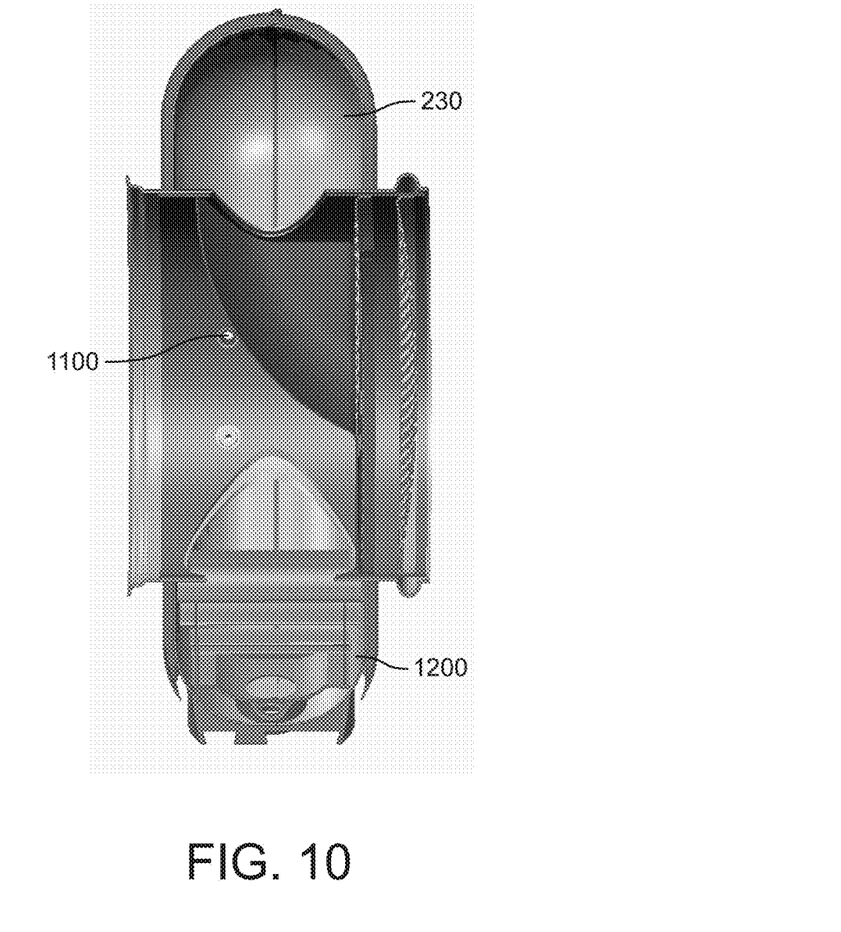
FIG. 10 is a cross-sectional view of yet another embodiment of a reactor pipe.
Figure 11:
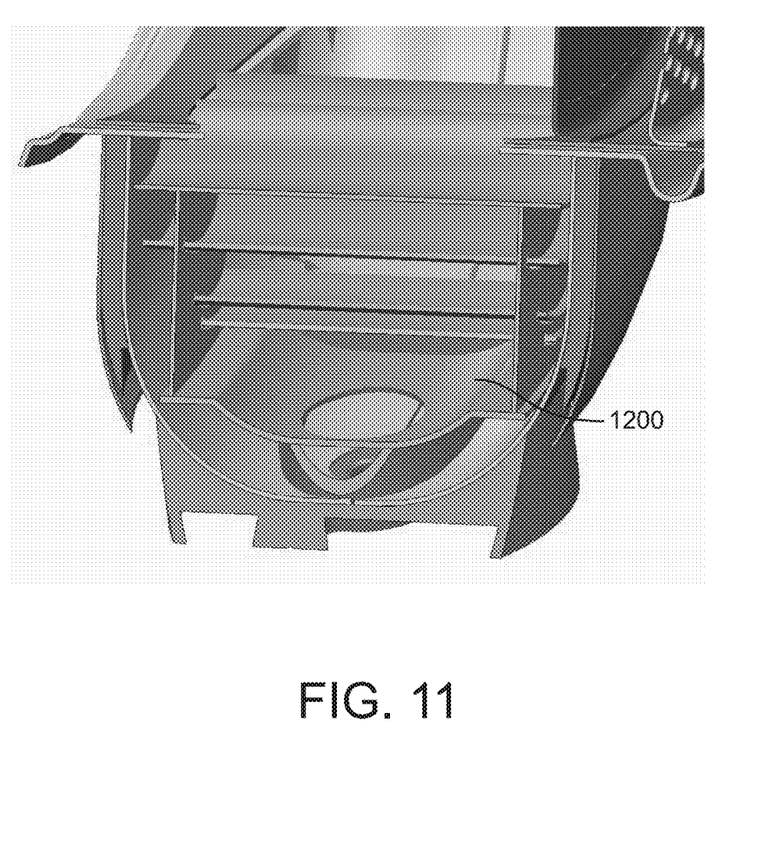
FIG. 11 is a cross-sectional view of a portion of the reactor pipe of FIG. 10.

FIGS. 10 and 11 depict views of yet another embodiment of the reactor pipe 150. The reactor pipe 150 of FIGS. 10 and 11 include one or more "pinhole" openings 1100 along the body 230 so as to allow a portion of exhaust to exit the reactor pipe 150. The reactor pipe 150 also includes a structure 1200 positioned within the body 230 to aid in interrupting the flow of the exhaust. The structure 1200 comprises an upper portion having a plurality of thin strips and a lower portion. The upper portion is connected to the lower portion through one or more side walls. The lower portion can have one or more dented, bowed, and/or curved surfaces with one or more apertures positioned within one or more of the surfaces. In some embodiments, the structure 1200 is positioned along the radial loop of the body 230. In another embodiment, the structure 1200 is positioned proximate (e.g., above) a port 360 of the reactor pipe 150 that provides an aperture through which diesel exhaust fluid is injected into the reactor pipe 150. The structure 1200 promotes mixing of the diesel exhaust fluid with the exhaust within the reactor pipe 150.

The foregoing description of embodiments of the disclosure has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the disclosure in various embodiments and with various modifications as are suited to the particular use contemplated. Other substitutions, modifications, changes and omissions may be made in the disclosure's operating conditions and arrangement of the embodiments without departing from the scope of the present invention. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A reactor pipe configured to receive an injection of reductant from an injector into a flow of exhaust exiting an engine, the reactor pipe comprising:
   an inlet portion structured to receive the flow of exhaust exiting the engine into the reactor pipe;
   a plurality of louvers positioned proximate the inlet portion, the plurality of louvers structured to alter a direction of a flow of exhaust;
   an outlet portion in fluid communication with a selective catalytic reduction catalyst and structured to allow the flow of exhaust to exit the reactor pipe and enter the selective catalytic reduction catalyst; and a radial loop extending between the inlet portion and the outlet portion, the radial loop being an exterior loop structured to couple to an aftertreatment system such that the radial loop curves around an exterior of a body of the aftertreatment system, the radial loop receiving the flow of exhaust through the inlet portion and directing the flow of exhaust toward the outlet portion, the radial loop configured to reduce the velocity of the flow of exhaust such that the reductant has increased time to react with the exhaust.

2. The reactor pipe of claim 1, wherein the inlet portion is shaped so as to prevent a stagnation of the flow of exhaust at a point where the exhaust enters the reactor pipe.

3. The reactor pipe of claim 1, wherein the inlet portion is fluidly connected to a particulate filter positioned upstream of the reactor pipe, the inlet portion being structured to prevent a stagnation of the flow of exhaust at a point at an exit wall of the particulate filter and to alter the direction of the flow of exhaust so as to provide a smooth transition out of the particulate filter into the reactor pipe.

4. The reactor pipe of claim 1, wherein the inlet portion is fluidly connected to an oxidation catalyst positioned upstream of the reactor pipe, the inlet portion being structured to prevent a stagnation of the flow of exhaust at a point at an exit wall of the oxidation catalyst and to alter the direction of the flow of exhaust to provide a smooth transition out of the oxidation catalyst into the reactor pipe.

5. The reactor pipe of claim 1, wherein the plurality of louvers are structured to condition a portion of the flow of exhaust into exhaust assisted ports in the injector such that droplets of the reactant entrains with the flow of exhaust.

6. The reactor pipe of claim 1, wherein the outlet portion comprises a contoured shape, the contoured shape guiding the flow of exhaust as the outlet portion expands to a receiving surface of the selective catalytic reduction catalyst.

7. The reactor pipe of claim 1, wherein the injector is configured to inject the reductant at increased rates for the production of high nitrogen oxide within the exhaust.

8. The reactor pipe of claim 1, wherein the radial loop curves around an outer surface of the selective catalytic reduction catalyst in-line with a particulate filter.

9. The reactor pipe of claim 1, further comprising a plurality of perforated plates structured to uniformly distribute the reductant over a face of the selective catalytic reduction catalyst.

10. The reactor pipe of claim 9, wherein the plurality of perforated plates are structured to open incrementally to a plurality of different positions.

11. The reactor pipe of claim 10, wherein the plurality of perforated plates are positioned proximate the outlet portion.

12. The reactor pipe of claim 1, wherein the radial loop has a helical shape.

13. The reactor pipe of claim 1, wherein the radial loop has a non-helical shape.

14. An aftertreatment system, comprising:
an injector structured to inject a reductant into exhaust received from an engine;
a catalyst positioned downstream of the injector, the catalyst structured to treat the exhaust; and
a reactor pipe positioned upstream of the catalyst, the reactor pipe structured to receive the reductant from the injector, the reactor pipe comprising:
an inlet portion structured to receive a flow of the exhaust, a plurality of louvers positioned proximate the inlet portion, the plurality of louvers structured to redirect flow of the exhaust,
an outlet portion structured to allow the exhaust to exit the reactor pipe, and
a radial loop extending between the inlet portion and the outlet portion, the radial loop being an exterior loop curving around an exterior of a body of the aftertreatment system, the radial loop receiving the exhaust into the inlet portion and directing the exhaust toward the outlet portion, wherein the radial loop is configured to reduce the velocity of the exhaust such that the reductant has increased time to react with the exhaust.

15. The system of claim 14, wherein the reactor pipe further comprises one or more perforated plates positioned proximate the outlet portion, the plurality of perforated plates structured to uniformly distribute the reductant over a face of the catalyst.

16. The system of claim 14, wherein the injector is located on an outer surface of the reactor pipe.

17. The system of claim 14, further comprising an oxidation catalyst in fluid communication with the reactor pipe and positioned upstream of the reactor pipe.

18. The system of claim 14, further comprising a diesel particulate filter in fluid communication with the reactor pipe and positioned upstream of the reactor pipe.

19. The system of claim 14, wherein the radial loop has a helical shape.

20. The system of claim 14, wherein the radial loop has a non-helical shape.

21. An engine system, comprising:
an engine; and
an aftertreatment system in fluid communication with the engine and structured to treat exhaust exiting the engine, the aftertreatment system including:
a selective catalytic reduction catalyst positioned downstream of the engine and structured to receive the exhaust from the engine, and
a reactor pipe in fluid communication with the engine and the selective catalytic reduction catalyst, the reactor pipe positioned upstream of the selective catalytic reduction catalyst, the reactor pipe comprising:
an inlet portion structured to receive the exhaust,
a plurality of louvers positioned proximate the inlet portion, the plurality of louvers structured to adjust the direction of a flow of the exhaust,
an outlet portion structured to allow the exhaust to exit the reactor pipe,
one or more perforated plates positioned proximate the outlet portion, the one or more perforated plates configured to open incrementally to a plurality of different positions, and
a radial loop extending between the inlet portion and the outlet portion, the radial loop being an exterior loop curving around an exterior of a body of the aftertreatment system, the radial loop receiving the exhaust from the inlet portion and directing the exhaust toward the outlet portion, wherein the radial loop is configured to reduce the velocity of the exhaust such that inserted reductant has increased time to react with the exhaust.

22. The engine system of claim 21, wherein the radial loop curves around an outer surface of the selective catalytic reduction catalyst and in-line with a particulate filter.

23. The engine system of claim 21, wherein the radial loop is configured to reduce the speed of the flow of exhaust.

24. The engine system of claim 21, further comprising an oxidation catalyst in fluid communication with the reactor pipe and positioned upstream of the reactor pipe.

25. The engine system of claim 21, wherein the plurality of perforated plates are configured to uniformly distribute the reductant over a face of the selective catalytic reduction catalyst.

26. The engine system of claim 21, wherein the radial loop has a helical shape.

27. The engine system of claim 21, wherein the radial loop has a non-helical shape.

28. The reactor pipe of claim 1, wherein the radial loop does not spiral around the exterior of the body of the reactor.

29. The aftertreatment system of claim 14, wherein the radial loop does not spiral around the exterior of the body of the reactor.

30. The engine system of claim 21, wherein the radial loop does not spiral around the exterior of the body of the reactor.

* * * * *